Feb. 20, 1962  YOSHIHIRO SHIMULA ET AL  3,022,423
SYSTEM FOR MEASURING THE LATTICE SPACING
OF CRYSTAL BY MEANS OF X-RAYS
Filed Dec. 22, 1959
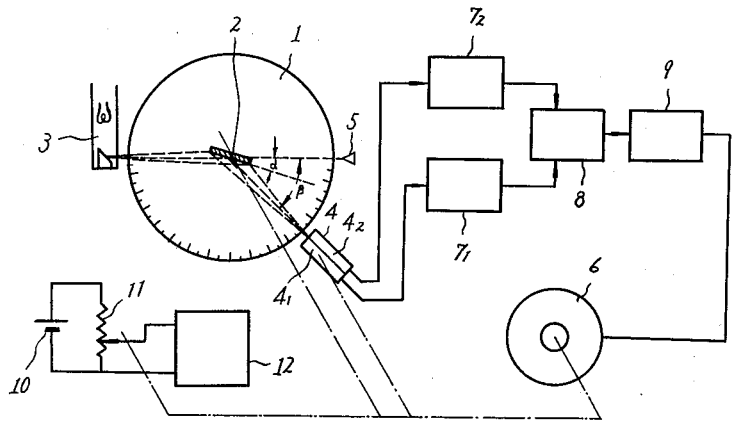
*Fig-1-*
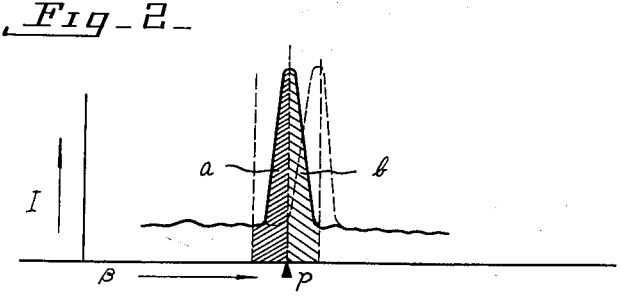
*Fig-2-*
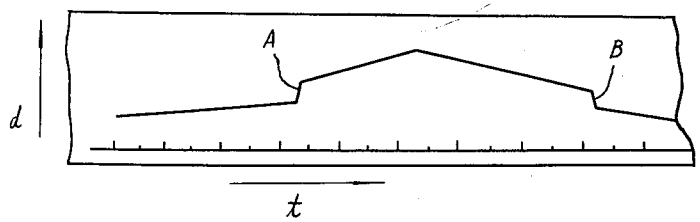
*Fig-3-*

United States Patent Office 3,022,423
Patented Feb. 20, 1962

3,022,423
SYSTEM FOR MEASURING THE LATTICE SPACING OF CRYSTAL BY MEANS OF X-RAYS
Yoshihiro Shimula and Hiroshi Uchida, Tokyo, Japan, assignors to Rigaku Denki Company Limited, Tokyo, Japan
Filed Dec. 22, 1959, Ser. No. 861,241
Claims priority, application Japan Dec. 22, 1958
1 Claim. (Cl. 250—51.5)

This invention relates to a system for measuring the lattic spacing of crystal by means of X-rays.

As is known, lattice spacing of crystal can be known by measuring the diffraction angle of X-rays of a certain wavelength bathing the surface of a crystal. For the measurement, for instance, of the process of changes in lattice spacing caused by temperature variation on the basis of the foregoing principle, it has been the practice heretofore that a diffraction angle at a given temperature being measured first and again measured after the temperature of the crystal is changed somewhat, thus measurement was repeated. From the data thus obtained, it was made possible to obtain information on the variation of internal structure or variation of crystal lattice caused by temperature change of material by drawing a graph on which the relation between lattice spacing and temperature is illustrated.

Such a conventional method has disadvantages in that the measurement procedure is not only very troublesome and requires long time operation, but also possible uncontinuous changes in lattice spacing which might take place in the transition process between a certain temperature and on adjacent different temperature cannot be detected or little changes in such lattice spacing cannot be known.

A main object of this invention is to provide a measuring system in which the above defects are entirely removed and the transition of change crystal lattice spacing is automatically measured and recorded precisely by X-ray diffraction.

For the purpose of attaining the above object of this invention, it is composed of a measuring system wherein a twin counter tube is used as a counter tube for X-ray diffractometer provided with a specimen heating device and the center of the twin counting tube traces the center of a diffraction line by utilizing an output taken out from the twin counter tube and the angle of diffraction lines is recorded by converting it into a potential.

In order that it may be clearly understood and readily carried into effect, the invention will now be described, by way of example, with reference to the accompanying drawings, in which:

FIG. 1 is a schematic block diagram of a measuring system according to this invention;

FIG. 2 shows intensity distribution curves of diffracted X-rays illustrating the principle of this invention; and FIG. 3 is an example of a recorded pattern obtained by the measuring system of this invention.

In FIG. 1 showing elements in the system of the present invention, a crystal 2 the lattice spacing of which is to be measured is placed in the center of a goniometer 1, and an X-ray tube 3 is positioned at a part of a peripheral edge of the goniometer. Then, X-rays of a certain wavelength are bathed on the surface of the crystal 2 as shown in dotted line, and the twin counter tube 4 is attached at the peripheral edge of the goniometer whereby the crystal 2 and the goniometer 1 are rotated by an electric motor 6 in such a manner that angle $\alpha$ between the position 5 of zero angle opposite to the X-ray tube 3 and the surface of the crystal 2 and angle $\beta$ between that and the position where the twin counter 4 is driven are always kept at a relation of one to two. The twin counter tube 4 is one air tight tube which is separated by a partition into two chambers having independent receiving parts $4_1$ and $4_2$ respectively therein and has X-ray inlet windows very close to each other.

Output of the receiving parts $4_1$ and $4_2$ of such twin counter tube is applied to respective rate meters $7_1$ and $7_2$, and the output is applied to a differential amplifier 8 so as to increase output difference of each of the rate meters. The output of this amplifier 8 is further increased by a power amplifier 9 for driving an electric motor and this increased output is applied to an electric motor 6 for driving the goniometer. That is, when the output of the receiving parts $4_1$ and $4_2$ of the twin counter tube 4 is equal, then the output of the amplifier 8 is made to be zero, and consequently the electric motor 6 stops and the goniometer stops. Also, if the output of the receiving part $4_1$ is increased larger than that of the receiving part $4_2$, then the goniometer is rotated toward the direction of increasing rotation angles $\alpha$ and $\beta$, and if the receiving part $4_2$ is increased, the goniometer is rotated toward the direction of decreasing rotation angles $\alpha$ and $\beta$. Further, a potentiometer composed of an electric source 10 and a sliding resistance 11 is driven by the electric motor 6 and its output voltage is applied to an automatic recorder 12 so as to move a recording pen in accordance with the above voltage, and the feed of a recording chart paper is made at a constant speed and simultaneously the crystal is heated by an electric heating wire and the like so as to raise or lower its temperature at a constant speed.

As above described, since the rotation angles $\alpha$ and $\beta$ of the surface of the crystal 2 and of the twin counter tube 4 are kept at the relation of one to two without any relation to the rotation angle of the goniometer, X-rays diffracted by the surface of the crystal 2 enter the twin counter tube. The intensity distribution of diffracted X-rays at the position of this counter tube is shown in a curve in FIG. 2 when the travelling angle of the goniometer 1 is shown on the abscissa and X-ray intensity I on the ordinate.

Accordingly, when the center of the twin counter tube is placed just at the position corresponding to the diffraction angle of the X-ray, that is, when it is placed at the position shown by $p$ in FIG. 2, X-rays of $a$ and $b$ showed by dense lines and coarse lines respectively enter into the two receiving parts $4_1$ and $4_2$. As these parts have substantially almost the same area, the output of the receiving parts $4_1$ and $4_2$ are kept in a balanced state, and for this reason, the output of the amplifier 8 being made to be zero, the operation of the electric motor 6 stops, and the goniometer remains stationary.

However, when the lattice spacing changes by temperature variation of the crystal and the diffraction angles of the X-rays change, intensity distribution is obtained as shown in a dotted line in FIG. 2. For this reason, since intensities of the X-rays entering into each of the receiving parts $4_1$ and $4_2$ of the twin counter tube 4 have different values which causes breaking of the balance of their output, the amplifier 8 generates an output of polarity corresponding to the increase and decrease of the diffraction angle of X-ray, and the electric motor 6 rotates to the right or left depending on the output polarity. Consequently, the goniometer 1 rotates in the direction to take again a balanced state, and when the balance is obtained, the output of the amplifier 8 decreases and stops the operation of the electric motor 6. That is, when the lattice spacing changes by elevation or lowering of the temperature of the crystal to be measured, the diffraction angles of the X-rays also change, and consequently the balance of the outputs of the twin counter tube is broken and the electric motor 6 is rotated so as to rotate the goniometer to the position corresponding to the diffraction angle of the X-ray. In such a tracing movement, the goniometer 1 is always rotated corresponding to the change of the lattice spacing of the crystal. The lattice spacing could be obtained by reading the value of the rotation angle of the goniometer.

In the practical example of FIG. 1, a potentiometer is connected to the electric motor 6 and the output corresponding to the rotation angle is automatically recorded by applying the output to an automatic recorder 12.

FIG 3 shows one example of a pattern recorded on the recorder 12 wherein when the temperature of the crystal is raised at an equal speed and reaches certain temperature and is again lowered at an equal speed, and the feed of recording paper on $x$ axis direction is kept at an equal speed, temperature gradients $t$ are scaled in equal intervals thereon, while value $d$ of lattice spacing obtained from the rotation angle of the goniometer is directly indicated on $y$ axis. Accordingly, from the graph of FIG. 3, relation between crystal temperature and lattice spacing can be known instantly.

The lattice spacing $d$, as is well known, can be known from the diffraction angle in a accordance with Bragg equation $$n\lambda = 2d \sin \theta$$

$n$=positive integer
$\lambda$=wavelength of incident X-ray
$\theta$=diffraction angle As above described, the measuring system of this invention is not only very easy to operate but also as the goniometer is driven in such a manner that diffracted X-rays are divided into $a$ and $b$ at a position of highest intensity as shown in FIG. 2, the operation of the goniometer is effected very precisely and even a minor change of lattice spacing can be correctly detected.

What we claim is:

A device for measuring the change of the lattice spacing of a crystal as a function of a temperature change of the crystal, said device comprising a goniometer of circular shape having a determinable periphery, a counter tube on the periphery of the goniometer, an X-ray source, the crystal being centrally located in the goniometer and adapted to be irradiated by the X-ray source, the X-ray being irregularly diffracted from said crystal, means for varying the temperature of the crystal, said goniometer and said crystal being adapted for angular rotation and providing an angle between said crystal and said X-ray source which is about one-half the angle between said counter tube and said X-ray source, said counter tube being partitioned into two sections, each of said sections being sensitive to the X-rays that are diffracted from the crystal to provide an output, and detection means attached to said counter tube and responsive to the difference between the output of the sections to rotate the goniometer.

References Cited in the file of this patent
UNITED STATES PATENTS 2,514,382      Friedman et al. _____ July 11, 1950

OTHER REFERENCES

Birks et al.: A High Temperature X-Ray Diffraction Apparatus, article in The Review of Scientific Instruments, vol. 18, No. 8, August 1957.